United States Patent
Han et al.

(10) Patent No.: US 11,374,233 B2
(45) Date of Patent: Jun. 28, 2022

(54) GAS DIFFUSION LAYER FOR FUEL CELLS AND APPARATUS AND METHOD FOR MANUFACTURING THE SAME

(71) Applicant: HYUNDAI MOTOR COMPANY, Seoul (KR)

(72) Inventors: Kook Il Han, Seongnam-si (KR); Yoo Chang Yang, Gunpo-si (KR); Sang Mun Jin, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 499 days.

(21) Appl. No.: 15/218,672

(22) Filed: Jul. 25, 2016

(65) Prior Publication Data

US 2017/0162880 A1    Jun. 8, 2017

(30) Foreign Application Priority Data

Dec. 8, 2015  (KR) .................... 10-2015-0173841

(51) Int. Cl.
*H01M 8/0245*  (2016.01)
*B05D 1/18*  (2006.01)
(Continued)

(52) U.S. Cl.
CPC ............ *H01M 8/0245* (2013.01); *B05D 1/18* (2013.01); *B05D 1/265* (2013.01);
(Continued)

(58) Field of Classification Search
CPC ............ H01M 8/0245; H01M 8/0234; H01M 8/0239; H01M 8/02; B05D 1/18;
(Continued)

(56) References Cited

U.S. PATENT DOCUMENTS 2,362,926 A * 11/1944 Porch ................... A23B 7/16
                                                   118/324
6,555,162 B1 * 4/2003 Takimoto ............ B05C 5/0208
                                                   118/104
(Continued)

FOREIGN PATENT DOCUMENTS

CN       1608331 A       4/2005
CN       102110822   * 12/2009   ............ H01M 4/94
(Continued)

OTHER PUBLICATIONS

Shi et al. (Journal of Nanomaterials vol. 16 Issue 1, Jan. 2015 Article No. 122).*

(Continued)

*Primary Examiner* — Cynthia H Kelly
*Assistant Examiner* — Aaron J Greso
(74) *Attorney, Agent, or Firm* — Morgan, Lewis & Bockius LLP

(57) ABSTRACT

An apparatus for manufacturing a gas diffusion layer for fuel cells includes: a conveyer transferring a base sheet for a macroporous layer of the gas diffusion layer in one direction before water repellent coating; a nozzle disposed around the conveyer to coat the transferring base sheet with a water repellent in a fiber type or desired pattern; and a nozzle transfer unit combined with an upper end of the nozzle to transfer the nozzle along a desired trajectory.

11 Claims, 8 Drawing Sheets

(51) Int. Cl.
*B05D 1/26* (2006.01)
*H01M 8/0234* (2016.01)
*H01M 8/0239* (2016.01)

(52) U.S. Cl.
CPC ........ *H01M 8/0234* (2013.01); *H01M 8/0239* (2013.01); *Y02P 70/50* (2015.11)

(58) Field of Classification Search
CPC . B05D 1/265; B05D 1/26; Y02P 70/56; Y02P 70/50
See application file for complete search history.

(56) References Cited

U.S. PATENT DOCUMENTS

| | | | |
|---|---|---|---|
| 2002/0134501 A1* | 9/2002 | Fan | H01M 4/8807 156/308.2 |
| 2003/0118910 A1* | 6/2003 | Carlson | H01M 50/449 429/247 |
| 2003/0194557 A1* | 10/2003 | Wilde | C04B 35/83 428/408 |
| 2004/0219688 A1* | 11/2004 | Churchill | B01J 19/0046 436/180 |
| 2005/0064275 A1* | 3/2005 | Mekala | H01M 8/023 429/530 |
| 2007/0298293 A1* | 12/2007 | Son | H01M 4/8652 429/483 |
| 2009/0110998 A1* | 4/2009 | Miyachi | B29C 41/28 429/494 |
| 2009/0220833 A1* | 9/2009 | Jones | H01M 8/2484 429/468 |
| 2010/0129696 A1* | 5/2010 | Hong | H01M 4/8807 429/439 |
| 2010/0219563 A1* | 9/2010 | Chang | D01D 5/0069 264/465 |
| 2012/0112389 A1* | 5/2012 | Wu | D01D 5/003 264/466 |
| 2012/0208106 A1* | 8/2012 | Dale | H01M 4/8807 429/534 |
| 2013/0040213 A1* | 2/2013 | Ito | H01M 4/8652 429/414 |
| 2013/0323620 A1* | 12/2013 | Tatsuno | H01M 4/8605 429/482 |

FOREIGN PATENT DOCUMENTS

| | | |
|---|---|---|
| CN | 102024961 A | 4/2011 |
| CN | 103413947 A | 11/2013 |
| JP | 2007-323874 A | 12/2007 |
| JP | 2009-211953 A | 9/2009 |
| JP | 2014-222565 A | 11/2014 |
| KR | 10-2003-0011929 A | 2/2003 |
| KR | 10-2008-0110026 A | 12/2008 |
| KR | 10-2009-0080160 A | 7/2009 |
| KR | 10-2010-0109733 A | 10/2010 |
| KR | 10-2010-0132249 A | 12/2010 |

OTHER PUBLICATIONS

Barbir, F. "PEM Fuel Cells Theory and Practice" 2013, p. 100-101, Elsevier New York.*
Shi et al. [Shi] (Journal of Nanomaterials vol. 16, No. 1, 2015, pp. 1-20). (Year: 2015).*
C. Lim et al., "Effects of hydrophobic polymer content in GDL on power performance of a PEM fuel cell," Electrochimica Acta 49 2004) 4149-4156.
C. Lim et al., "Effects of hydrophobic polymer content in GDL on power performance of a PEM fuel cell," Elsevier, Electrochimica Acta, No. 49, Apr. 2004, pp. 4149-4156.

* cited by examiner

-- Related Art --

- AFTER WATER REPELLENT COATING -

-- Related Art --

- BEFORE WATER REPELLENT COATING -

-- Related Art --

GAS DIFFUSION LAYER FOR FUEL CELLS AND APPARATUS AND METHOD FOR MANUFACTURING THE SAME

CROSS-REFERENCE TO RELATED APPLICATION

This application claims under 35 U.S.C. § 119(a) the benefit of priority to Korean Patent Application No. 10-2015-0173841 filed on Dec. 8, 2015, the entire content of which is incorporated herein by reference.

TECHNICAL FIELD

The present disclosure relates to a gas diffusion layer for fuel cells and an apparatus and method for manufacturing the same. More particularly, the present disclosure relates to a gas diffusion layer for fuel cells which may prevent the size of pores in a macroporous layer and a microporous layer constituting the gas diffusion layer from reducing and improve a water-repellent property, and an apparatus and method for manufacturing the same.

BACKGROUND

In general, a fuel cell is a power generation device which produces electricity, i.e., an energy source of a fuel cell vehicle. The fuel cell has a structure in which an anode to which hydrogen is supplied and a cathode to which air is supplied are stacked in a state where an electrode membrane assembly is interposed therebetween, and generates electrical energy using a chemical reaction between oxygen in the air and hydrogen supplied from outside.

The fuel cell is stacked to form a fuel cell stack in which several tens to hundreds of unit cells are stacked. Each cell includes a polymer electrolyte membrane, catalyst layers applied to both surfaces of the electrolyte membrane so that hydrogen and oxygen may react with each other, i.e., the cathode and the anode, gas diffusion layers stacked on outer surfaces of the cathode and the anode, and separation plates stacked on outer surfaces of the gas diffusion layers to supply a fuel and to discharge water generated by the reaction.

The gas diffusion layer serves as a movement passage for oxygen, hydrogen, vapor, and electrons between channels of the separation plates and the catalyst layer including the cathode and the anode, and simultaneously, serves as a water discharge passage.

In more detail, the gas diffusion layer uniformly supplies reacting gas (oxygen, hydrogen, etc.) to the catalyst layer and transmits generated electrons. The gas diffusion layer further minimizes flooding of each fuel cell by discharging water generated through the reaction.

Referring to FIG. 8, a conventional gas diffusion layer has a dual-layer structure including a microporous layer (MPL) having carbon powder and a water repellent and a macroporous layer (referred to as a base or a carbon fiber layer) including carbon fiber, carbonized resin and a water repellent.

In general, a conventional method for manufacturing a gas diffusion layer includes manufacturing a macroporous layer by coating a base sheet formed of carbon fiber with a water repellent using a dipping process and manufacturing a microporous layer by mixing a water repellent and carbon powder and then applying the mixture to the surface of the macroporous layer.

The dipping process generally includes coating the base sheet by continuously dipping the base sheet into a water repellent liquid diluted in a designated concentration, and sintering of drying the solvent.

However, the conventional gas diffusion layer has the following problems.

When the microporous layer of the gas diffusion layer is manufactured, as described above, the base sheet is coated with a water repellent using the dipping process in order to impart a water repellent property to the base sheet formed of carbon fiber. Here, the coated water repellent clogs pores between carbon fiber molecules, and thus, reduce the size of the pores.

FIGS. 9A and 9B illustrate states of a microporous layer before and after coating using a water repellent [from C. Y. Wang et al., Electrochimica Acta 49 (2004) pp 4149-4156]. According to FIGS. 9A and 9B, the size of pores between carbon fiber molecules after coating using the water repellent greatly decreased, as compared to the size of pores between the carbon fiber molecules before coating using the water repellent.

When the size of the pores between the carbon fibers of the macroporous layer is reduced, gas diffusion performance and water discharge performance of the gas diffusion layer are deteriorated.

Further, when the content of the water repellent increases to improve the water-repellent property of the macroporous layer, the size of the pores in the macroporous layer and performance of the gas diffusion layer may decrease.

Moreover, a water repellent is added to the microporous layer directly contacting the anode or the cathode and, in the same manner, the water repellent clogs pores in the microporous layer and thus lowers gas diffusion performance and water discharge performance of the gas diffusion layer.

SUMMARY OF THE DISCLOSURE

The present disclosure has been made in an effort to solve the above-described problems associated with the prior art. An aspect of the present disclosure provides a gas diffusion layer for fuel cells in which a macroporous layer and a microporous layer of the gas diffusion layer are coated with a fiber-type water repellent or a water repellent in a designated pattern so as to prevent the reduction in the sizes of pores in the macroporous layer and the microporous layer and to improve water repellent performance, and an apparatus and method for manufacturing the same.

According to an exemplary embodiment in the present disclosure, an apparatus for manufacturing a gas diffusion layer for fuel cells includes a conveyer transferring a base sheet for a macroporous layer of the gas diffusion layer in one direction before water repellent coating, a nozzle disposed around the conveyer to coat the transferring base sheet with a water repellent in a fiber type or desired pattern, and a nozzle transfer unit combined with an upper end of the nozzle to transfer the nozzle along a desired trajectory.

The apparatus may further include a dip coating unit disposed at a position before or after the nozzle to coat the base sheet with a water repellent using a dipping method.

An electric nozzle having a solenoid valve to adjust an opening degree of the nozzle may be employed as the nozzle, and a power supply unit to adjust voltage and then to apply the voltage to the solenoid valve or to apply voltage to the solenoid valve in a duty cycle may be connected to the electric nozzle.

An LM guide, in which the nozzle is mounted so as to be transferable in the widthwise direction or the lengthwise direction, may be employed as the nozzle transfer unit.

A motor, in which the nozzle is mounted thereon so as to be eccentrically rotatable, may be employed as the nozzle transfer unit.

According to another exemplary embodiment in the present disclosure, a method for manufacturing a gas diffusion layer for fuel cells, including manufacturing a macroporous layer by coating a carbon fiber base sheet with a water repellent as a fiber type or in a desired pattern and manufacturing a microporous layer by coating the surface of the macroporous layer with a coating liquid acquired by mixing a fiber-type water repellent with carbon powder.

Manufacturing the macroporous layer may include coating the carbon fiber base sheet with a water repellent using a dipping method before or after coating the base sheet with the water repellent as the fiber type or in the desired pattern.

Manufacturing the macroporous layer may include adjusting the thickness and length of the water repellent, when the carbon fiber base sheet is coated with the water repellent as the fiber type or in the desired pattern.

When an electric nozzle having a solenoid valve to adjust an opening degree of the nozzle discharges the water repellent as the fiber type or in the desired pattern, adjustment of the thickness of the water repellent may be carried out by adjusting voltage applied to the solenoid valve for adjusting the opening degree of the nozzle and adjustment of the length of the water repellent may be carried out by adjusting voltage applied to the solenoid valve in a duty cycle.

Manufacturing the microporous layer may be carried out by coating the surface of the macroporous layer with a coating liquid formed by mixing a general water repellent in addition to the fiber-type water repellent with the carbon powder.

In manufacturing the microporous layer, the coating of the surface of the macroporous layer with the coating liquid may be carried out using comma coating or doctor blade coating.

Other aspects and exemplary embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present disclosure.

Figure 1:
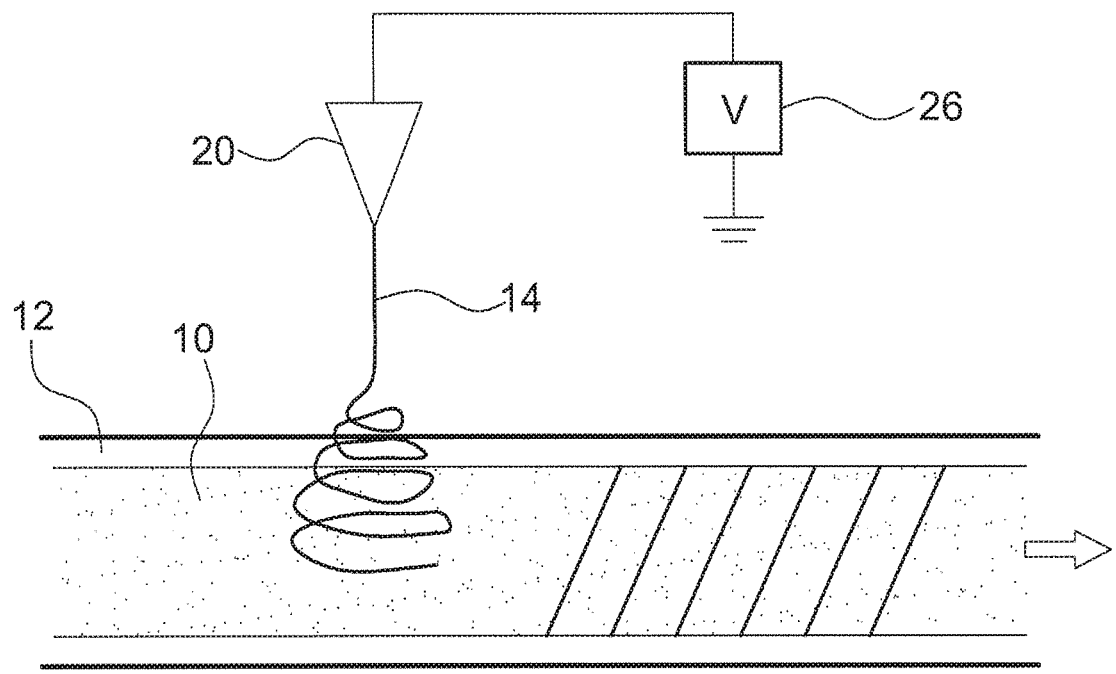
FIG. 1 is a schematic view illustrating an apparatus for manufacturing a gas diffusion layer for fuel cells in accordance with one embodiment in the present disclosure.
Figure 2:
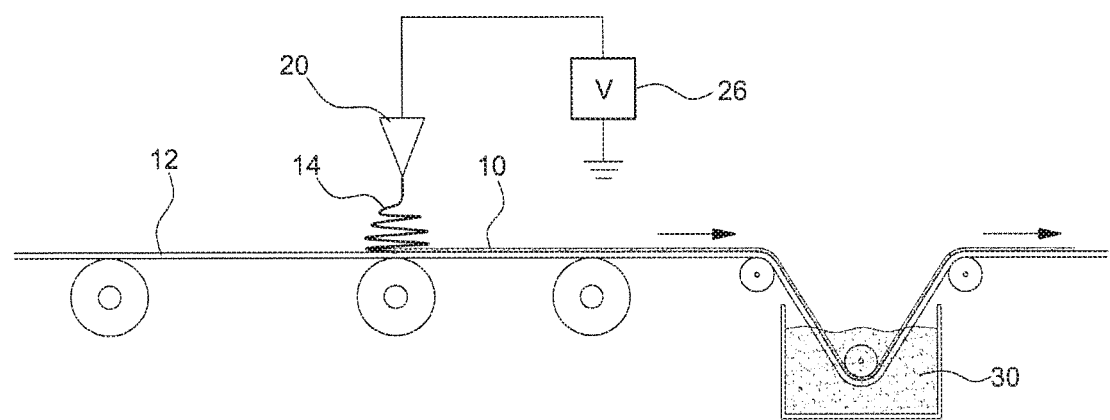
FIG. 2 is a schematic view illustrating an apparatus for manufacturing a gas diffusion layer for fuel cells in accordance with another embodiment in the present disclosure.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

FIG. 1 is a schematic view illustrating an apparatus for manufacturing a gas diffusion layer for fuel cells in accordance with one embodiment in the present disclosure. Here, reference numeral 10 indicates a base sheet for a macroporous layer constituting a gas diffusion layer.

The base sheet 10 is a carbon fiber base sheet constituting the macroporous layer, i.e., a paper-type sheet formed of carbon fiber.

First, as a prerequisite for manufacturing the macroporous layer constituting the gas diffusion layer of the present disclosure through a continuous process, the base sheet 10 is placed on a conveyer 12 and transferred in one direction.

The conveyer 12 transfers the base sheet 10 in one direction prior to water repellent coating to form the macroporous layer, in order to manufacture the gas diffusion layer through the continuous process.

Particularly, a nozzle 20 to discharge a water repellent 14 as a fiber type or in a desired pattern is disposed around the conveyer 12 and a water repellent supply tank (not shown) is connected to the nozzle 20.

Therefore, the nozzle 20 discharges the water repellent 14 onto the base sheet 10, being transferred along the conveyer 12, as a fiber type or in a desired pattern, thereby coating the base sheet 10 with the water repellent 14 as the fiber type or in the desired pattern.

Figure 3:
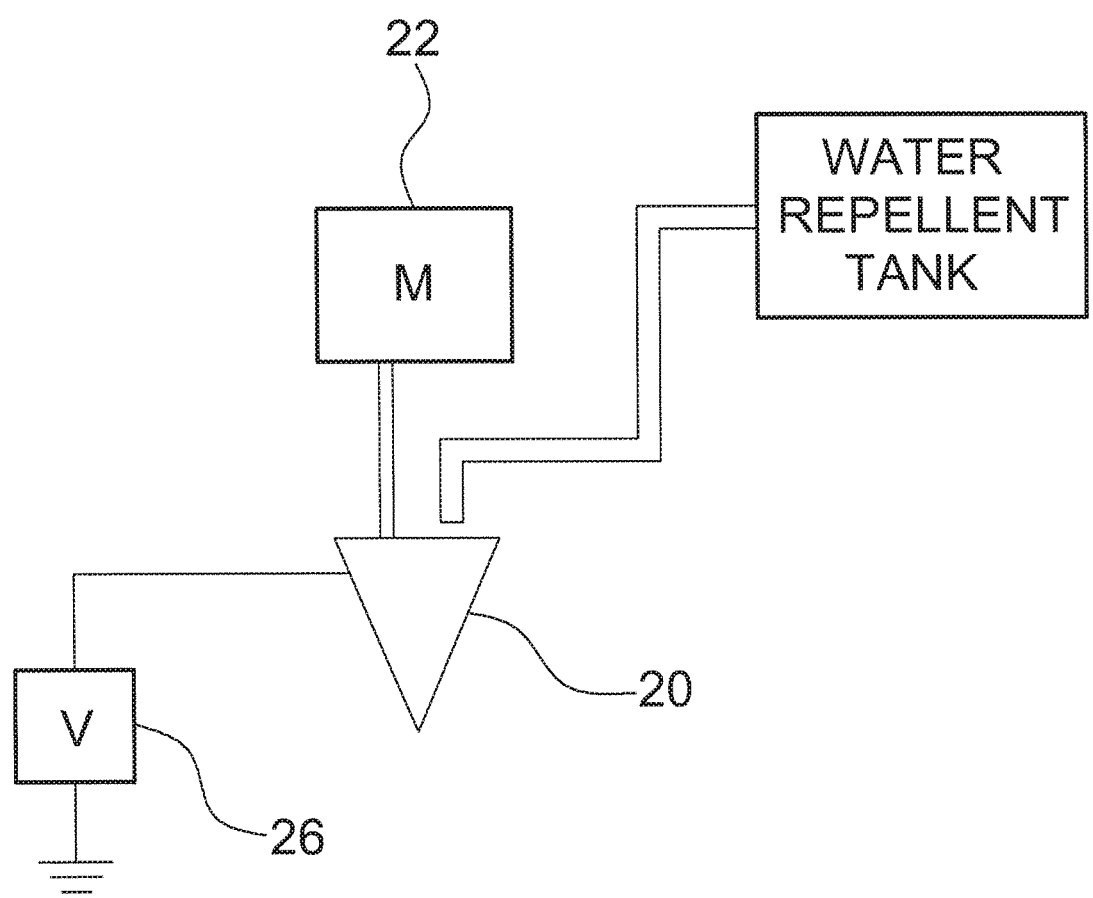
FIG. 3 is a side view of one example of a nozzle transfer unit of an apparatus for manufacturing a gas diffusion layer for fuel cells in accordance with one embodiment in the present disclosure.

Referring to FIG. 3, a nozzle transfer unit 40 to transfer the nozzle 20 along a desired trajectory may be combined with an upper end of the nozzle 20, and the water repellent 14 may be discharged as the fiber type or in the desired pattern from the nozzle 20 by operating the nozzle transfer unit 40.

As one example of the nozzle transfer unit 40, a motor 22 on which the nozzle 20 is mounted so as to be eccentrically rotatable may be used, as shown in FIG. 3.

Therefore, when the motor 22 rotates in a state where the upper end of the nozzle 20 is eccentrically connected to a rotary shaft of the motor 22, the nozzle 20 eccentrically rotates, and thus, the water repellent 14 discharged from the nozzle 20 may be discharged as a fiber type, i.e., a circular type.

Figure 4:
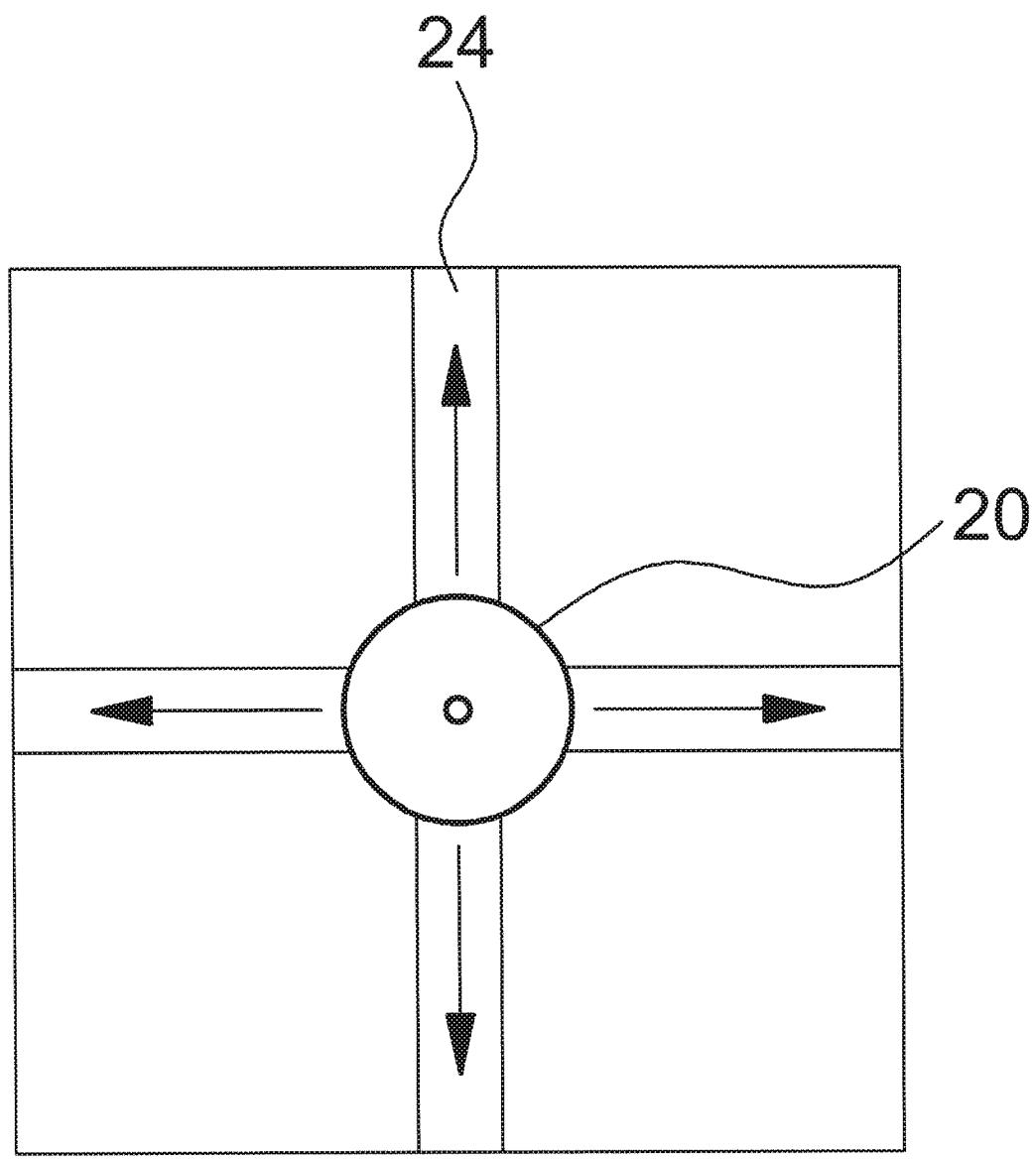
FIG. 4 is a bottom view of another example of a nozzle transfer unit of an apparatus for manufacturing a gas diffusion layer for fuel cells in accordance with one embodiment in the present disclosure.

As another example of the nozzle transfer unit 40, a linear motor (LM) guide 24 on which the nozzle 20 is mounted so as to be transferable in the widthwise direction or the lengthwise direction may be used, as exemplarily shown in FIG. 4.

Therefore, when the LM guide 24 is driven, the nozzle 20 linearly moves in the widthwise direction or the lengthwise direction and thus, the water repellent 14 discharged from the nozzle 20 may be discharged in a straight pattern.

Figure 5A:
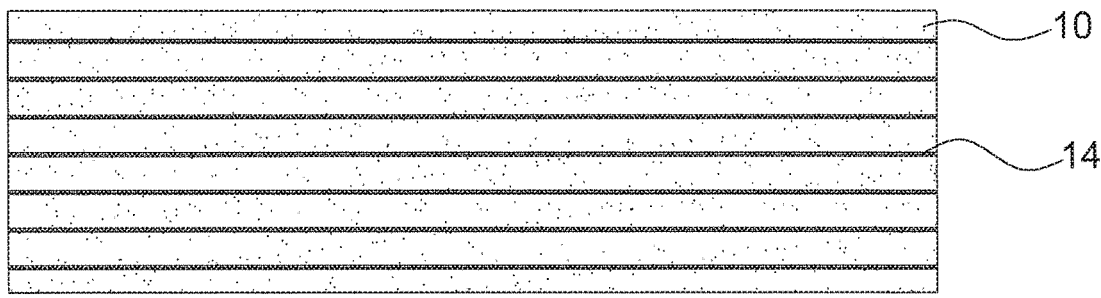
FIGS. 5A-5C are plan views illustrating a water repellent coated on a gas diffusion layer for fuel cells in designated patterns in accordance with the present disclosure.
Figure 5B:
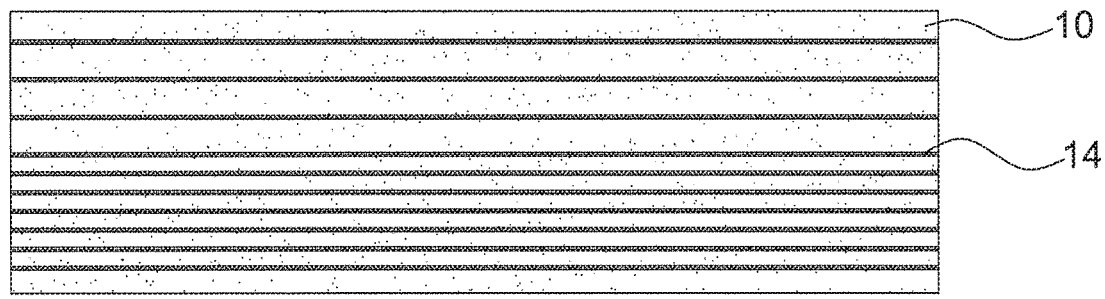
Figure 5C:
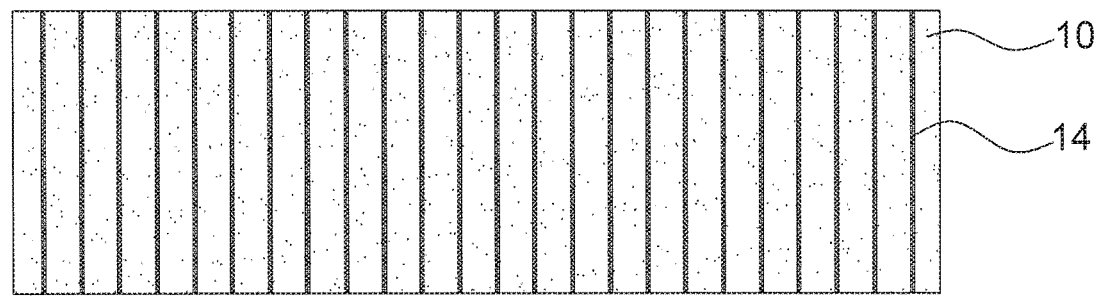

Accordingly, after the base sheet 10 is coated with the water repellent 14 repeatedly discharged from the nozzle 20 in a designated straight pattern, when the coated base sheet 10 is cut to a designated size for constituting a fuel cell stack, macroporous layers shown in FIGS. 5A-5C may be acquired.

As shown in FIGS. 5A-5C, the water repellent 14 formed in a designated straight pattern may coincide with a separation plate for supplying gas or channel regions of the separation plate, thereby improving water repellent performance to discharge water generated by the water repellent 14. Further, as shown in FIG. 5B, the water repellent 14 in a straight pattern may be more densely coated on specific regions so as to improve water drainage from the specific regions of the gas diffusion layer.

In addition, the water repellent 14 in various patterns may be applied so as to coincide with the shape of gas supply channels in the separation plate.

An electric nozzle having a solenoid valve (not shown) for adjusting the opening degree of the nozzle is employed as the nozzle 20, and a power supply unit 26, which adjusts voltage and then applies the voltage to the solenoid valve, or which applies voltage to the solenoid valve in a duty cycle, is connected to the electric nozzle.

Therefore, when the power supply unit 26 applies different levels of the voltage to the solenoid valve or applies voltage to the solenoid valve in a duty cycle, as the water repellent 14 is discharged from the nozzle 20 in a fiber type or desired pattern, the thickness and length of the water repellent 14 may be adjusted.

In more detail, a method for adjusting the thickness of the water repellent 14 includes adjusting a voltage and applying the voltage to the solenoid valve for adjusting the opening degree of the nozzle 20 by the power supply unit 26, varying the opening degree of the nozzle 20 through operation of the solenoid valve, and discharging the water repellent 14 from the nozzle 20, the opening degree of which is adjusted, in a small thickness or a large thickness.

Further, a method for adjusting the length of the water repellent 14 includes adjusting a voltage in a duty cycle and applying the voltage to the solenoid valve by the power supply unit 26, repeating opening and closing of the nozzle 20 by repetition of operation and stop of the solenoid valve according to the voltage duty cycle, and discharging the water repellent 14 from the nozzle 20 in a long length or a short length according to the opening and closing time of the nozzle 20.

As described above, by forming the macroporous layer constituting the gas diffusion layer by coating the base sheet 10 with the water repellent 14 as a fiber type or in a designated pattern, pores between molecules of the water repellent 14 as the fiber type or in the desired pattern are formed and, thus, a reduction in the size of pores in a conventional macroporous layer due to a water repellent may be prevented.

When water generated by reactions in the fuel cell contacts the water repellent 14 in the fiber type or desired pattern, water is split into several drops, and thus, the water repellent performance may be improved.

In addition, the split water drops may be easily discharged through fine pores in the macroporous layer, and thus, discharge performance of generated water may be improved.

Further, before or after coating the base sheet 10 with the water repellent 14 in the fiber type or desired pattern discharged from the nozzle 20, coating the base sheet 10 with the water repellent 14 using a dipping method may be further carried out.

For this purpose, a dip coating unit 30 to coat the base sheet 10 with the water repellent 14 using the dipping method is further disposed at a position before or after the nozzle 20.

Therefore, after the base sheet 10 is coated with the water repellent 14 as the fiber type or in the desired pattern, when the base sheet 10 passes by the dip coating unit 30 along the conveyer 12, the base sheet 10 is coated with the water repellent 14 within the dip coating unit 30.

In addition, by allowing the base sheet 10 to pass by the dip coating unit 30 before the base sheet 10 is coated with the water repellent 14 as the fiber type or in the desired pattern, the base sheet 10 may be coated with the water repellent 14 within the dip coating unit 30 in advance.

The base sheet 10 is coated with the water repellent 14 using the dipping method before or after coating the base sheet 10 with the water repellent 14 as the fiber type or in the desired pattern for the following reasons.

In general, a base sheet is coated with a water repellent using the dipping process in which the base sheet is dipped into a container filled with a water repellent. However, it is difficult to uniformly coat the base sheet with the water repellent in a thickness direction of a macroporous layer.

Figure 6:
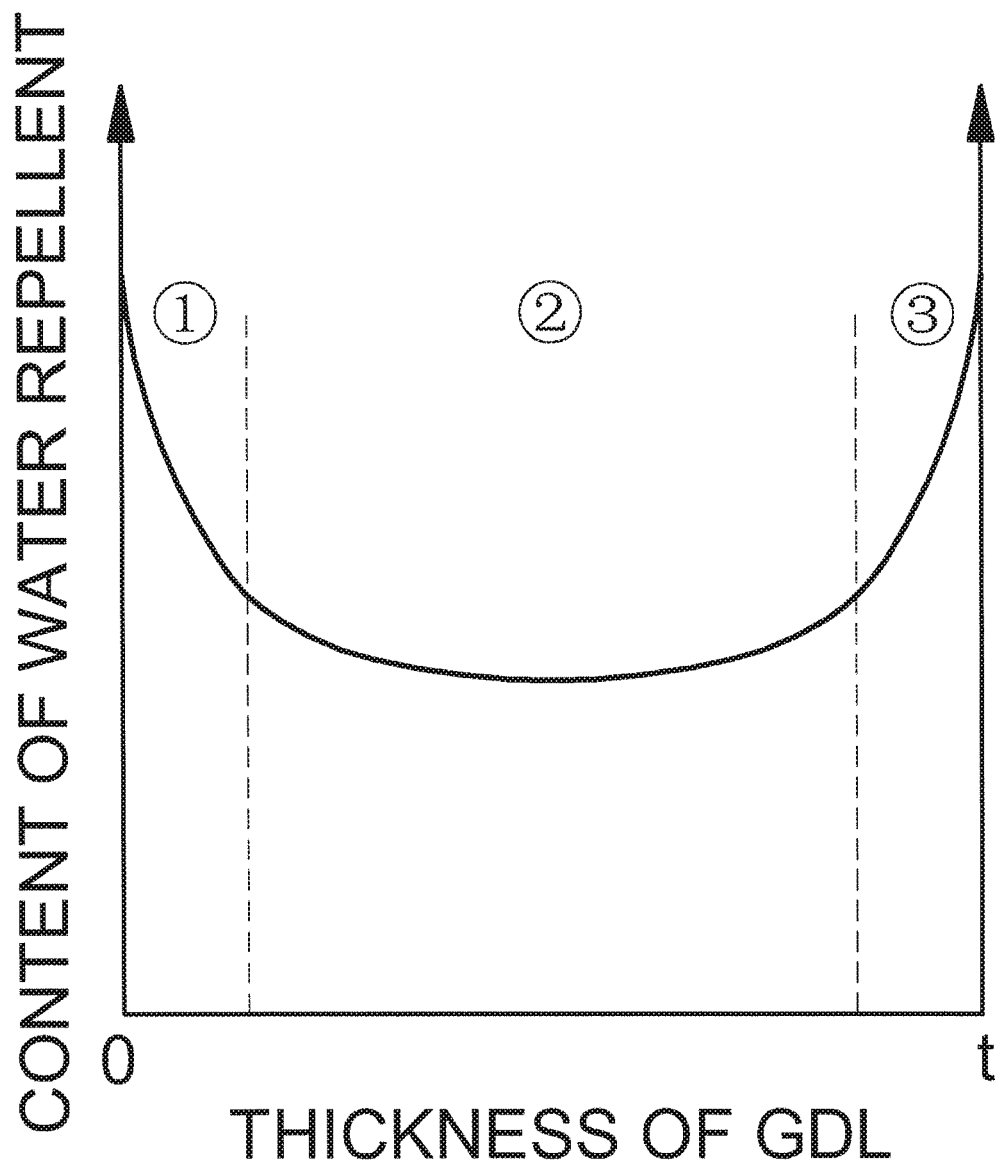
FIG. 6 is a graph illustrating contents of a water repellent in the thickness direction of a gas diffusion layer when the gas diffusion layer is coated with the water repellent through a dipping process.

That is, when the base sheet is dried and sintered after the dipping process, the content of the water repellent on the surface of the base sheet increases (indicated by ① and ③ in FIG. 6) and the content of the water repellent at the inside of the base sheet decreases (indicated by ②), as exemplarily shown in FIG. 6.

In order to overcome this drawback, when a dipping time of the base sheet into the water repellent increases, the water repellent may be uniformly disposed to some degree in the thickness direction of the macroporous layer, but an excessive increase in the amount of the water repellent coating the macroporous layer may reduce the size of the pores in the macroporous layer, and an increase in the manufacturing process time of the gas diffusion layer may lower productivity.

Figure 7:
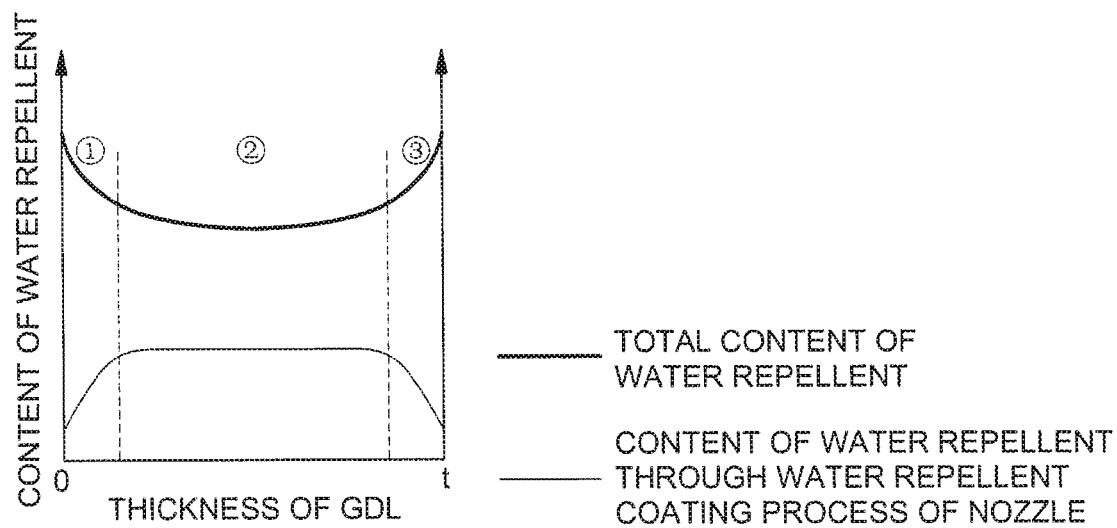
FIG. 7 is a graph illustrating contents of water repellents in a thickness direction of a gas diffusion layer when both coating of the gas diffusion layer with a fiber-type water repellent by a nozzle and coating of the gas diffusion layer with a water repellent through a dipping process are carried out.
Figure 8:
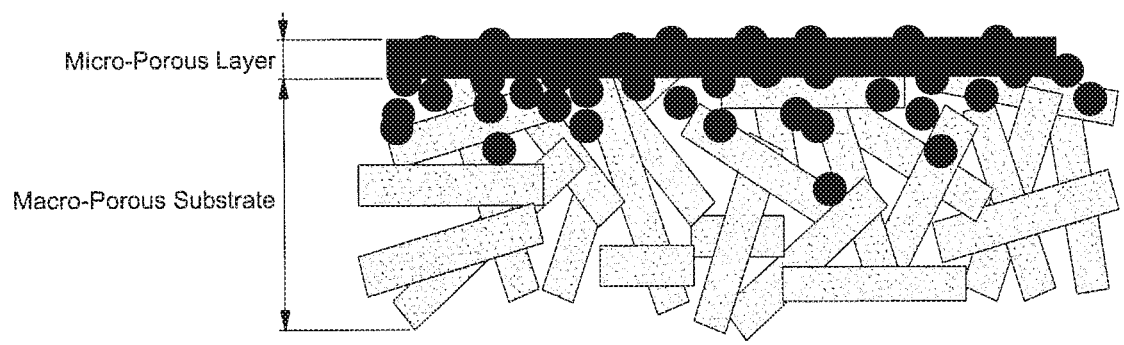
FIG. 8 is a schematic cross-sectional view illustrating a structure of a gas diffusion layer according to a related art.
Figure 9A:
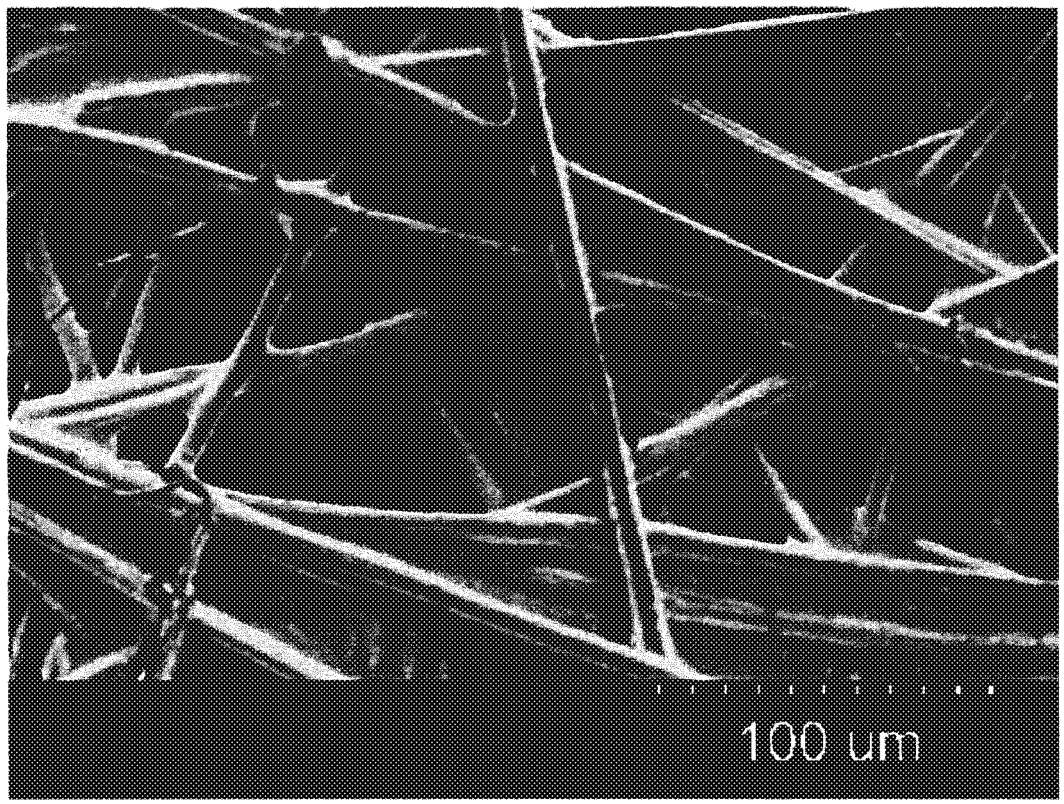
FIGS. 9A and 9B show electron micrographs of a conventional gas diffusion layer.
Figure 9B:
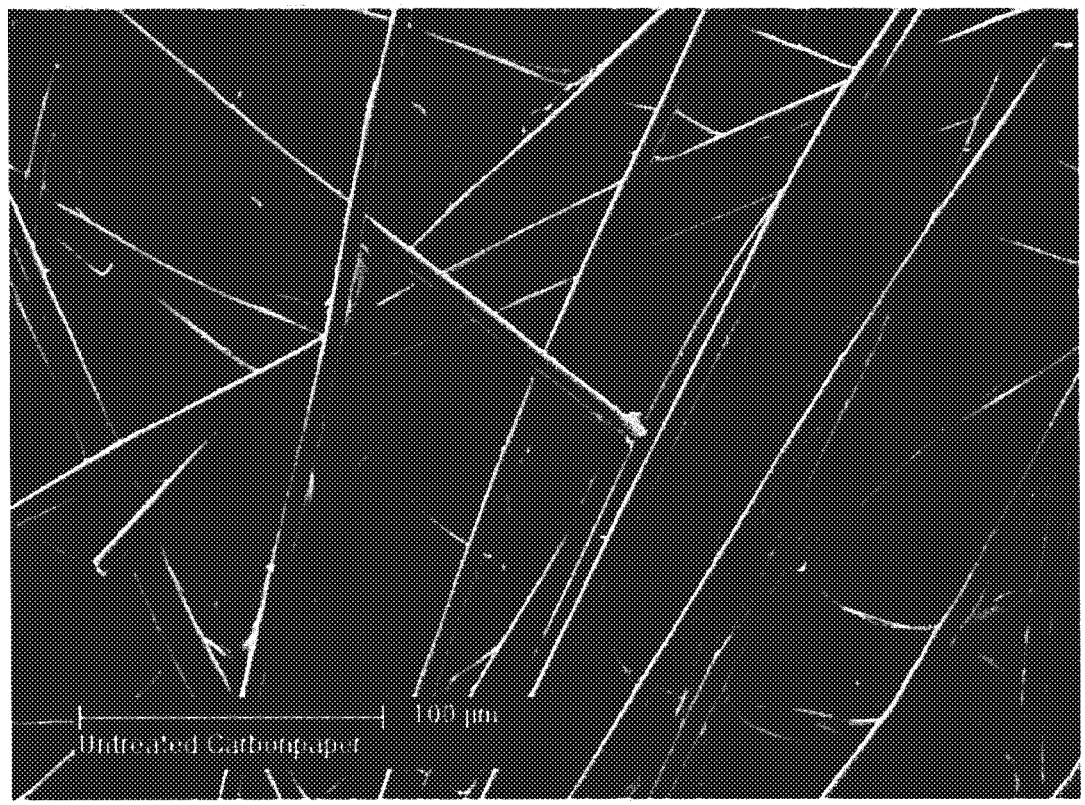

Therefore, in the present disclosure, the base sheet 10 is further coated with the water repellent 14 for a short period of time before or after coating the base sheet 10 with the water repellent 14 in the fiber type or desired pattern, and thus, the contents of the water repellent 14 may be uniformly disposed in the thickness direction of the macroporous layer, as shown in FIG. 7.

In the fuel cell, it is important to maintain durability and water balance in unit cells. Therefore, in order to prevent accumulation of an excessive amount of water in the respective unit cells, the gas diffusion layer of each unit cell has a separate microporous layer stacked on the macroporous layer.

The microporous layer is manufactured using carbon powder instead of carbon fiber, which is mainly used to manufacture the macroporous layer so as to have pores more densely disposed than the pores in the macroporous layer.

Here, in the same manner as a reduction in the size of pores in the macroporous layer, a water repellent mixed with the carbon powder to exhibit a water-repellent property of the microporous layer may reduce the size of pores in the microporous layer.

Therefore, when the microporous layer is manufactured, a coating liquid, in which a fiber-type water repellent is mixed with carbon powder, is applied to the surface of the macroporous layer or a coating liquid, in which a fiber-type water repellent and a general water repellent are mixed with carbon powder, is applied to the surface of the macroporous layer.

That is, the microporous layer of the present disclosure is manufactured by coating the surface of the macroporous layer with a coating liquid, in which a fiber-type water repellent is mixed with carbon powder, using comma coating or doctor blade coating, or manufactured by coating the surface of the macroporous layer with a coating liquid, in which a fiber-type water repellent and a general water repellent are mixed with carbon powder using comma coating or doctor blade coating.

Since the fiber-type water repellent is present in the microporous layer constituting the gas diffusion layer, the reduction in the size of pores in the microporous layer may be prevented. When water generated by the reactions in the fuel cell contacts the fiber-type water repellent, the water is split into several drops, and thus, water repellent performance may be improved.

As is apparent from the above description, a gas diffusion layer for fuel cells, and an apparatus and method for manufacturing the same in accordance with the present disclosure provide the following effects.

First, when a base sheet for a macroporous layer constituting the gas diffusion layer is coated with a water repellent, the base sheet is coated with a fiber-type water repellent or a water repellent in a designated pattern, and thus, reduction in the size of pores in the macroporous layer may be prevented.

Second, when the macroporous layer is coated with the fiber-type water repellent or the water repellent in the desired pattern, the total area of the water repellent is reduced. When water generated by chemical reactions in a fuel cell contacts the fiber-type water repellent or a water repellent in a designated pattern, the water is split into several drops, and thus, water repellent performance and discharge performance of the generated water may be improved.

Third, a microporous layer constituting the gas diffusion layer contains a fiber-type water repellent. Thus, reduction in the size of pores in the microporous layer may be prevented and water repellent performance to discharge the generated water may be improved.

The invention has been described in detail with reference to the embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a gas diffusion layer for fuel cells, the method comprising steps of:
   placing a carbon fiber base sheet on a conveyer and transferring the carbon fiber base sheet in one direction along the conveyer;
   discharging, by an electric nozzle, a first water repellent onto the carbon fiber base sheet to form straight patterns while the carbon fiber base sheet is being transferred along the conveyer, such that a macroporous layer including the first water repellent having the straight patterns to prevent a reduction in pore size is formed, wherein the electric nozzle has a solenoid valve for adjusting an opening and closing degree of the nozzle; and
   forming a microporous layer by coating a second water repellent including carbon powder on a surface of the macroporous layer, while the macroporous layer is being transferred along the conveyer.

2. The method of claim 1, wherein the step of forming the macroporous layer includes coating the carbon fiber base sheet with a water repellent using a dipping method before coating with the first water repellent.

3. The method of claim 1, wherein the step of forming the macroporous layer includes adjusting a thickness and a length of the first water repellent, when the carbon fiber base sheet is coated with the first water repellent.

4. The method of claim 3, wherein, when the electric nozzle discharges the first water repellent, the thickness of the first water repellent is adjusted by adjusting a voltage that is applied to the solenoid valve for adjusting the opening and closing degree of the nozzle and the length of the first water repellent is adjusted by adjusting a voltage that is applied to the solenoid valve in a duty cycle.

5. The method of claim 1, wherein the step of forming the microporous layer is carried out by coating the surface of the macroporous layer with a coating liquid, in which a water repellent is mixed with the carbon powder.

6. The method of claim 1, wherein the step of forming the microporous layer includes coating the surface of the macroporous layer with a coating liquid by using comma coating or doctor blade coating.

7. The method of claim 1, wherein the step of forming the macroporous layer includes coating the carbon fiber base sheet with a water repellent using a dipping method after coating the carbon fiber base sheet with the first water repellent.

8. The method of claim 1, wherein the nozzle is connected to and is eccentrically rotated by a motor, and
   wherein, when the nozzle eccentrically rotates in the step of forming the macroporous layer, the first water repellent is discharged in a circular shape from the nozzle.

9. The method of claim 1, wherein the nozzle is connected to a linear motor (LM) guide which transfers the nozzle in a widthwise or lengthwise direction, and
   wherein, when the nozzle linearly moves in the widthwise or lengthwise direction by the LM guide in the step of forming the macroporous layer, the first water repellent is discharged from the nozzle to form the straight patterns.

10. A method for manufacturing a gas diffusion layer for fuel cells, the method comprising steps of:

placing a carbon fiber base sheet on a conveyer and transferring the carbon fiber base sheet in one direction along the conveyer;

discharging, by an electric nozzle, a first water repellent onto the carbon fiber base sheet to form straight patterns while the carbon fiber base sheet is being transferred along the conveyer, such that a macroporous layer including the water repellent having the straight patterns to prevent a reduction in pore size is formed, wherein the straight patterns coincide with a separation plate for supplying gas or channel regions of the separation plate; and forming a microporous layer by coating a second water repellent including carbon powder on a surface of the macroporous layer, while the macroporous layer is being transferred along the conveyer, wherein the electric nozzle has a solenoid valve for adjusting an opening and closing degree of the electric nozzle.

11. A method for manufacturing a gas diffusion layer for fuel cells, the method comprising steps of:

placing a carbon fiber base sheet on a conveyer and transferring the carbon fiber base sheet in one direction along the conveyer;

discharging, by an electric nozzle, a first water repellent onto the carbon fiber base sheet to form straight patterns while the carbon fiber base sheet is being transferred along the conveyer, such that a macroporous layer including the water repellent having the straight patterns is formed; and forming a microporous layer by coating a second water repellent including carbon powder on a surface of the macroporous layer, while the macroporous layer is being transferred along the conveyer.

* * * * *